United States Patent [19]

Lambert, Jr.

[11] Patent Number: 5,440,654
[45] Date of Patent: Aug. 8, 1995

[54] FIBER OPTIC SWITCHING SYSTEM
[75] Inventor: L. Q. Lambert, Jr., Newton, Mass.
[73] Assignee: Raytheon Company, Lexington, Mass.
[21] Appl. No.: 175,994
[22] Filed: Dec. 30, 1993
[51] Int. Cl.$^6$ .............................................. G02B 6/26
[52] U.S. Cl. ..................... 385/17; 250/575; 359/39; 359/42
[58] Field of Search ............ 385/16, 17, 20, 21, 385/22, 24; 250/227.24, 227.25, 573–575, 578.1; 359/38, 39, 42, 54–58

[56] References Cited
U.S. PATENT DOCUMENTS

| | | | |
|---|---|---|---|
| 4,201,442 | 5/1980 | McMahon et al. | 385/17 |
| 4,385,799 | 5/1983 | Soref | 385/17 |
| 4,836,657 | 6/1989 | Gunji et al. | 359/38 |
| 4,856,863 | 8/1989 | Sampsell et al. | 385/17 X |
| 4,882,235 | 11/1989 | Resler | 428/642 |
| 4,964,701 | 10/1990 | Dorschner et al. | 350/336 |
| 4,988,157 | 1/1991 | Jackel et al. | 385/17 |
| 5,018,835 | 5/1991 | Dorschner | 350/336 |
| 5,093,747 | 3/1992 | Dorschner | 359/316 |
| 5,126,869 | 6/1992 | Lipchak et al. | 359/94 |
| 5,299,054 | 3/1994 | Geiger | 385/17 X |

FOREIGN PATENT DOCUMENTS
2-46431 2/1990 Japan ..................... 385/17

Primary Examiner—John D. Lee
Attorney, Agent, or Firm—Donald F. Mofford

[57] ABSTRACT

A data communication system comprising a plurality of fiber optic cables and a fiber optic switching system, comprising: a support structure for securing light emitting/light receiving ends of the plurality of fiber optic cables in predetermined positions; and, means for re-directing light emitted from the light emitting/light receiving end of one of the fiber optic cables to the light emitting/light receiving end to the light emitting/light receiving end of another one of the plurality of fiber optic cables. The re-directing means includes means for collimating and directing the light emitted from the end of one of the cables as a beam propagating along a pre-determined direction and for re-directing the beam towards the end of another one of the cables selectively in accordance with an electrical signal. More particularly, the re-directing means includes electro-optical phase shifting medium, preferably liquid crystal molecules.

12 Claims, 5 Drawing Sheets

FIBER OPTIC SWITCHING SYSTEM

BACKGROUND OF THE INVENTION

This invention relates generally to data communications systems and more particularly to fiber optic switching systems and methods used in such systems.

As is known in the art, fiber optics are being used in a wide variety of applications. One application is in the area of data communication systems. In such application, data, in the form of modulations of laser produced light, is transmitted to, and received from, a plurality of terminals through fiber optic cables. A switching network is provided to selectively direct the data to, and from, the terminals. Typically, the switching network converts light emitted by a transmitting one of the terminals into corresponding electrical signals. The electrical signals are directed to a selected output port of the switching network by electrical circuitry in the switching network. The electrical signals at the output port are converted into corresponding modulated light for retransmission through fiber optic cables to a receiving one of the terminals. The conversion of the modulated light to electrical signals and then back into modulated light energy, together with the electrical switching circuitry, requires the use of expensive components and/or restricts the potential bandwidth of the data communication system.

SUMMARY OF THE INVENTION

With this background of the invention in mind, it is therefore an object of this invention to provide an improved data communication switching network.

It is another object of the invention to provide an improved fiber optic switching system.

These and other objects of the invention are attained generally by providing a data communication system comprising a plurality of fiber optic cables and a fiber optic switching system, comprising: a support structure for securing light emitting/light receiving ends of the plurality of fiber optic cables in predetermined positions; and, means for re-directing light emitted from the light emitting/light receiving end of one of the fiber optic cables to the light emitting/light receiving end of another one of the plurality of fiber optic cables. The re-directing means includes means for collimating and directing the light emitted from the end of one of the cables as a beam propagating along a predetermined direction and for re-directing the beam towards the end of another one of the cables selectively in accordance with an electrical control signal. More particularly, the re-directing means includes electro-optical phase shifting medium, preferably liquid crystal molecules.

With such arrangement, light emitted by any one of the cables is switched to another one of the cables without requiring intermediate conversion of the transmitted light data into electrical signals and then re-conversion of the electrical signal into light data.

BRIEF DESCRIPTION OF THE DRAWINGS

The aforementioned features and other advantages of the invention, as well as the invention itself, will be more fully understood from the following description read together with the accompanying drawings, in which.

DESCRIPTION OF THE PREFERRED EMBODIMENTS

Figure 1:
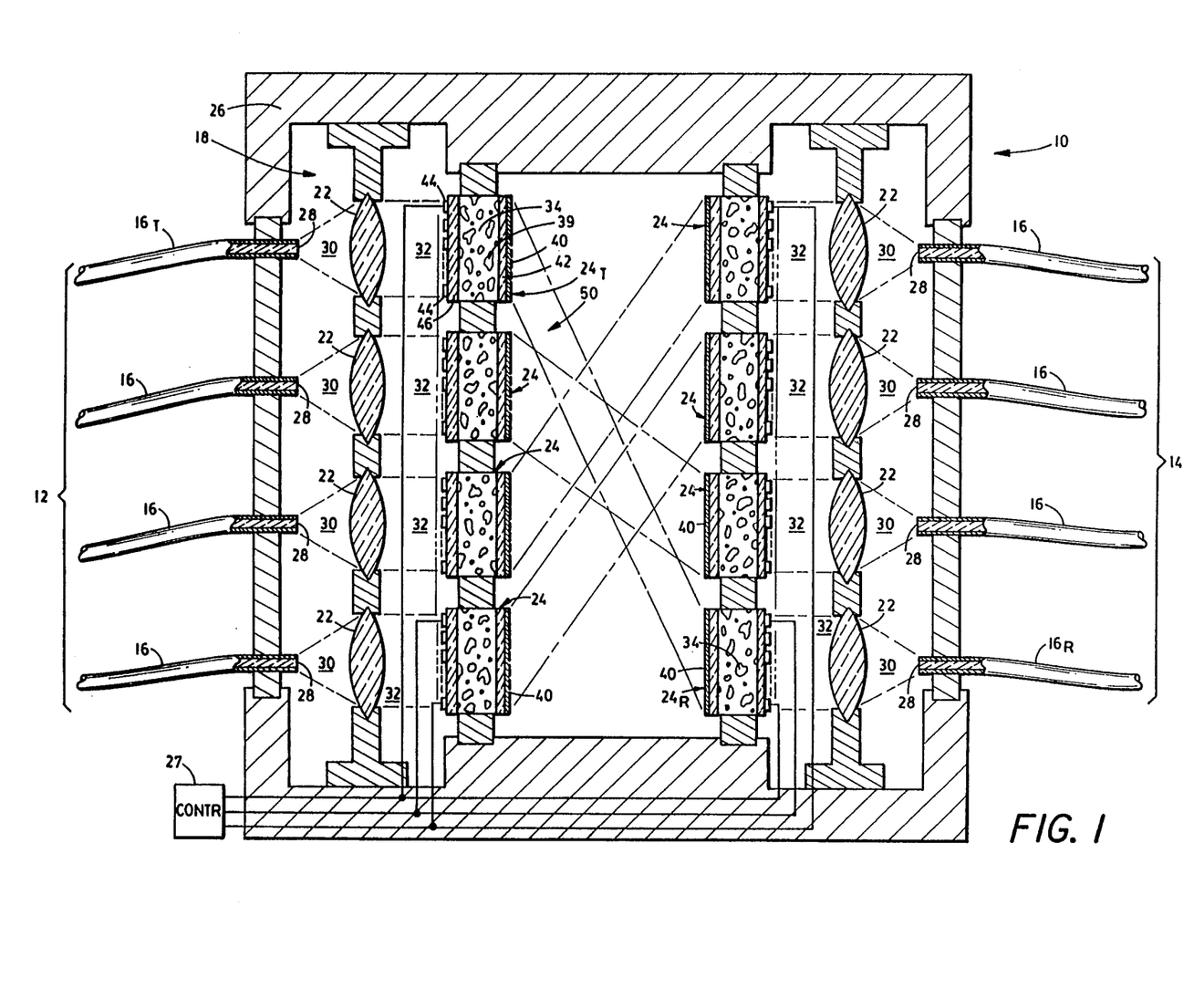
FIG. 1 is schematic diagram of a data communication system according to the invention.

Referring now to FIG. 1, a data communication system 10 is shown. Such system 10 includes two sets 12, 14 of fiber optic cables 16 and a fiber optic switching network 18. The switching network 18 includes: a plurality of collimating lenses 22; a plurality of beam steerers 24; a support structure 26 for securing light emitting/light receiving ends 28 of the plurality of fiber optic cables 16 in predetermined positions, for securing each one of the plurality of collimating lenses 22 in a predetermined position relative to a corresponding one of the fiber optic cables 16, and for securing each one of the beam steerers 24 in a predetermined position relative to a corresponding one of the fiber optic cables 16, as shown; and, a controller 27 for providing electrical control signals to the beam steerers 24. Thus, the supporting structure 26 positions the light emitting/light receiving end 28 of the fiber optic cable 16 along the optic axis of a corresponding collimating lens 22 and the optic axis of such lens 22 normal, and centrally disposed, to the beam intercepting surface of a corresponding beam steerer 24, as shown.

In operation, the divergent beam 30 of modulated light emitted at the terminal, or light emitting/light receiving, end 28 of a fiber optic cable 16 is collimated and directed as a collimated beam 32 of modulated light along the optic axis of the corresponding lens 22. The corresponding beam steerer 24 intercepts the collimated beam 32 and directs the intercepted collimated beam 32 to another one of the fiber optic cables 16 selectively in accordance with the electrical control signals supplied to the beam steerers 24 by controller 27. Therefore, modulated light transmitted by any one of the cables 16 in set 12 can be directed to any one of the fiber optic cables 16 in set 14 by electrical control signals fed to the beam steerers 24 by controller 27. Likewise, by principles of reciprocity, modulated light transmitted by any one of the cables 16 in set 14 can be directed to any one of the fiber optic cables 16 in set 12 by electrical control signals fed to the beam steerers 24 by controller 27. That is, the light emitted from the light emitting/light receiving end 28 of one of the fiber optic cables 16 in set 12, say cable $16_T$, is directed to the light emitting/light receiving end 28 of one of the plurality of fiber optic cables 16 in set 14, say cable $16_R$, selectively in accordance with an electrical control signal fed to the switching system 18, (i.e., the beam steerers $24_T$, $24_R$, corresponding to fiber optic cables $16_T$, $16_R$, respectively, as shown) by controller 27. By principles of reciprocity, the light emitted from the light emitting/light receiving end 28 of the fiber optic cable $16_R$ in set 14 is directed to the light emitting/light receiving end 28 to the light emitting/light receiving end 28 of fiber optic cable $16_T$ in set 12. Thus, in the general case, information can be transmitted and received between fiber optic cables 16 in set 12 and fiber optic cables 16 in set 14.

Each one of the beam steerers 24 includes electro-optical phase shifting medium, preferably liquid crystal molecules. Here, such beam steerer 24 includes a plurality of liquid crystal devices 34, arranged as shown in fixed relationship to the collimating lenses 22 by support structure 26. Here, each one of the liquid crystal devices 34 is of the type described in the following U.S. patents: U.S. Pat. No. 5,093,747, "Method For Providing Beam Steering in a Subaperture-Addressed Optical Beam Steerer", issued Mar. 3, 1993, inventor Terry A. Dorschner; U.S. Pat. No. 4,964,701, "Deflector for an Optical Beam" inventors Terry A. Dorschner et al; and, U.S. Pat. No. 5,018,835, "Deflector for an Optical Beam Using Refractive Means", issued May 23, 1991, inventor Terry A. Dorschner, all assigned to the same assignee as the present invention, such patents being incorporated herein by reference. As described in the aforementioned U.S. Pat. No. 5,018,835, a liquid crystal device 34 having a common electrode 40 on a first window 42 and a multiplicity of parallel stripe electrodes 44 on a second window 46 provides an optical beam phase shifter, here beam steerer 24. A multiplicity of electrical control signals, here supplied by controller 27, is applied between individual stripe electrodes 44. A reference potential, not shown is applied to the common electrode 40. The voltages applied to the stripe electrodes 44 thereby create local variations of the liquid crystal material 39, here E-7 or PTTP-33, sold by British Drug House, which variations cause differential phase shifts across the cross section of the collimated light beam 32 incident thereon. The molecules of the liquid crystal material 39 are long, thin, rod-like organic molecules of the so-called "nematic" phase. As described in the aforementioned U.S. Pat. No. 5,093,747, when voltages are applied to the stripe electrodes 44 the index of refraction of the liquid crystal material 39 will depend on the level of the voltage applied. The phase shift of the exiting collimated beam 50, relative to that of the incident collimated beam 32, will vary spatially to thereby define the direction of the exiting beam 50. As described, a linear phase ramps modulo $2\pi$, is established with electrode voltages to direct the exiting beam 50 in the desired angular direction. The beam 32 incident on the liquid crystal device 34, (i.e., beam steerer 24) is steered in a vertical direction and exits as beam 50, as shown. (It should be understood that if the control signal across the beam steerer 24 produces uniform voltages to the stripe electrodes 44 of the beam steerer 24, the beam incident thereon passes through the beam steerer 24 without any angular deflection).

Figure 2:
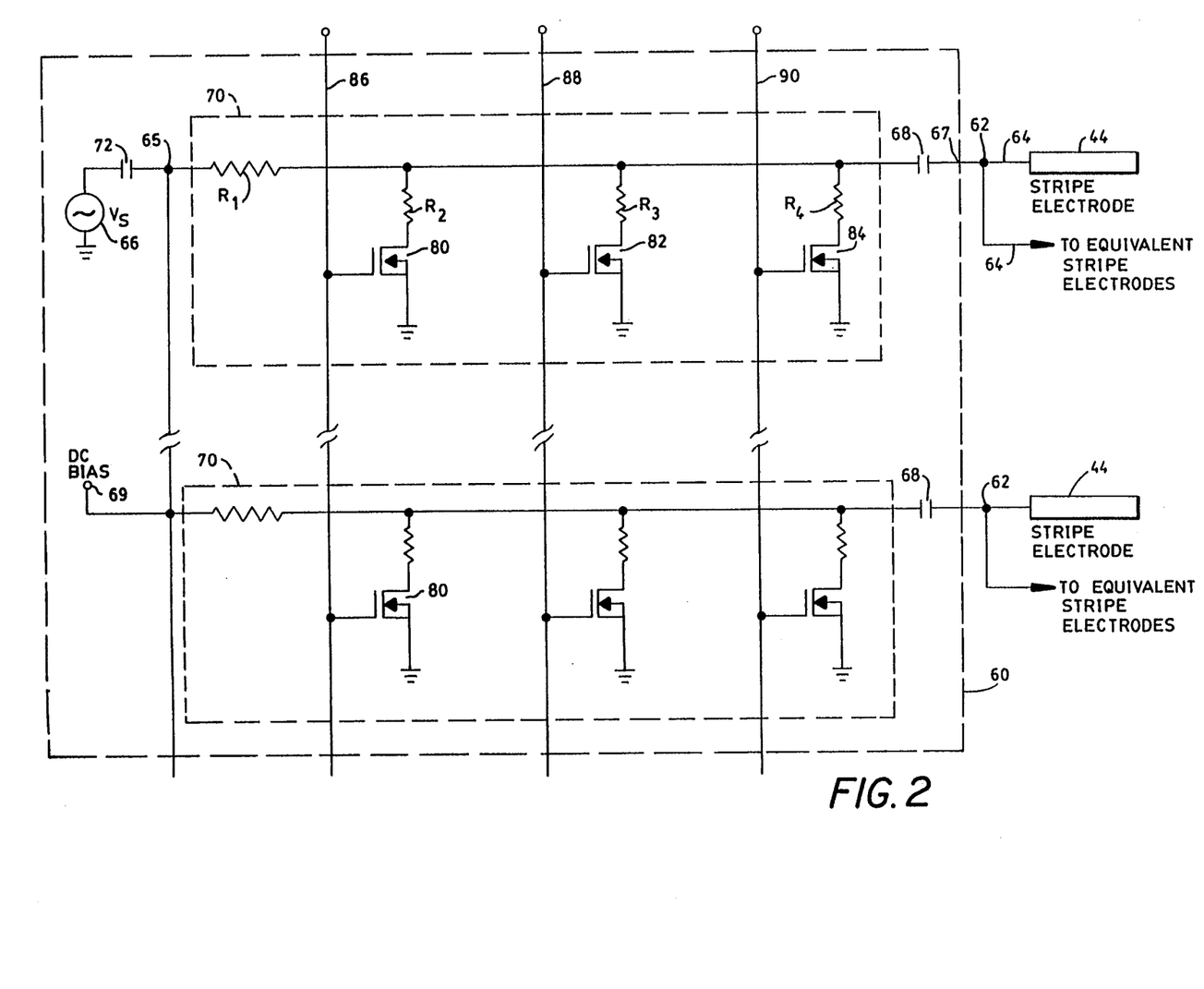
FIG. 2 is a schematic diagram of a circuit used to produce electrical control signals for beam steerers used in the communication system of FIG. 1.

Referring now to FIG. 2, a circuit 60, included within the controller 27 (FIG. 1), is shown for producing the voltages levels (i.e., the electrical control signals) on the stripe electrodes 44. As described in U.S. Pat. No. 5,093,747, an electrical conductor, or strap, is connected to a plurality of stripe electrodes 44. More specifically, a plurality of stripe electrodes 44 associated with a common one of a plurality of subarrays of liquid crystal devices, are connected to common strap. Each one of the straps is connected to a corresponding contact pad. Thus, circuit 60 includes a plurality of contact pads 62. Each one of the contact pads 62 is connected to a set of strip electrodes 44 by straps 64 as described in U.S. Pat. No. 5,093,747. Each one of the contact pads 62 is coupled to a voltage reference terminal 65 through serially connected dc blocking capacitor 68 and switchable voltage divider 70. The voltage reference terminal 65 is connected to an ac voltage reference source 66 through a dc blocking capacitor 72 and, such terminal 65 is connected to a dc bias voltage source 69, as shown.

Each one of the switchable voltage dividers 70 includes a plurality of, here three, field effect transistors 80, 82, 84. Each one of the transistors 80, 82, 84 has a grounded source electrode. The gate electrode of each one of the transistors 80 is connected to one of a plurality of control signal lines 86, 88, 90, here line 86, as shown. Likewise, the gate electrodes of transistors 82 are connected to control line 88, and the gate electrodes of transistors 84 are connected to control line 90. Each one of the switchable voltage dividers 70 includes a plurality of, here four, resistors $R_1$, $R_2$, $R_3$, and $R_4$. Resistor $R_1$ is serially connected between terminals 65 and 67. Each one of the resistors $R_2$, $R_3$, $R_4$ is connected between terminal 65 and a corresponding one of the gate electrodes of transistors 80, 82, 84, respectively, as shown. The control signals on control lines 86, 88, 90 are logic signals adapted to place the one of the transistors 80, 82, 84, respectively, into an "on" state or an "off" state. Each one of the resistors $R_2$, $R_3$, $R_4$ has a different value of resistance. When one of the transistors 80, 82, 84 is switched "on" the other two transistors are switched "off". It follows then that each one of the switchable voltage dividers 70 produces one of three voltage levels at the control pad 62 connected to it, such level being selected in accordance with the control signals on control lines 86, 88, and 90. That is, each of the voltage levels produced by switchable voltage divider 70 is produced on control pad 62 by activating the one of the control lines 86, 88, 90 unique to the desired steering state. Thus, in the general case, the number of control lines is equal to the number of steered states while the number of stripe electrodes 44 may be larger because of the straps 64 as described in U.S. Pat. No. 5,093,747. The ac voltage source 66 is typically a sine wave or a square wave with a peak to peak voltage less than 15 volts for large scale liquid crystal beam steerer. The dc blocking capacitor 68 isolates the transistor dc bias voltage source 69 from the stripe electrode 44.

In a beam steerer 24 of overall width D, the use of an integral number of phase ramps permits steering angles $\alpha$, where $\tan \alpha = n \lambda/D$. In order to limit the overlap of diffraction limited spots for adjacent steering states, it is preferred to access every other possible steering state, i.e. to let n be a multiple of 2. The preferred center-to-center spacing of the beam steerers used for optical switching is about 2D to prevent spot overlap and the attendant channel-to-channel cross talk. With these preferred optical parameters, the distance between the arrays of liquid crystal devices 34 is equal to $D^2/\lambda$. Table 1 shows the preferred distance between the liquid device 34 arrays for the 250 micrometer spacing fiber ribbon cable standard and different optical communication wavelengths.

TABLE 1

| | Steering Array Spacing | | |
|---|---|---|---|
| Fiber Ribbon Cable Spacing Standard (µ) | Device 34 Width (µ) | Communications Wavelength (µ) | Steering Array Spacing (mm) |
| 250 | 125 | .8 | 19.5 |
| | | 1.3 | 12.0 |
| | | 1.55 | 10.1 |

In the preferred optical configuration, the first steered position will correspond to two phase ramps across the liquid crystal device 34 (i.e., beam steerer 24). Each phase ramp requires a minimum of 3 stripe electrodes 44 to establish a preferred steering direction, however 4 stripe electrodes 44 is a minimum to achieve an 80% steering efficiency. Table 2 lists the number of stripe electrodes 44 and transistors required for the number of steering states of the liquid crystal device 34 assuming a minimum of 4 stripes per phase ramp. The percentage of the liquid crystal device 34 occupied by "flybacks" is also given for each steered state assuming the "flyback" corresponds to one half of the stripe electrode 44 spacing.

Each of the stripe electrode 44 arrangements in the Table produces the relative beam positions exactly with no angular errors. The next higher arrangement that produces all positions exactly provides 14 positions but requires 840 stripe electrodes 44 and 5880 transistor switches. In addition to the steered positions each liquid crystal device 34 has a neutral or forward directing position where the induced phase shift is uniform across the liquid crystal device 34.

TABLE 2

Electrode and Transistor Count

| # Steered Positions | # Stripe Electrodes | Transistor count | Beam Position (+ or −) | Electrodes per Ramp | Flyback % |
|---|---|---|---|---|---|
| 2 | 8 | 8 | 1 | 4 | 12.5 |
|   | 16 | 16 | 1 | 8 | 6.25 |
|   | 32 | 32 | 1 | 16 | 3.12 |
| 4 | 16 | 32 | 1 | 8 | 6.25 |
|   |   |   | 2 | 4 | 12.5 |
|   | 32 | 64 | 1 | 16 | 3.12 |
|   |   |   | 2 | 8 | 6.25 |
|   | 48 | 96 | 1 | 24 | 2.08 |
|   |   |   | 2 | 12 | 4.17 |
| 6 | 24 | 72 | 1 | 12 | 4.17 |
|   |   |   | 2 | 6 | 8.33 |
|   |   |   | 3 | 4 | 12.5 |
|   | 48 | 144 | 1 | 24 | 2.08 |
|   |   |   | 2 | 12 | 4.17 |
|   |   |   | 3 | 8 | 6.25 |
| 8 | 48 | 192 | 1 | 24 | 2.08 |
|   |   |   | 2 | 12 | 4.17 |
|   |   |   | 3 | 8 | 6.25 |
|   |   |   | 4 | 6 | 8.33 |
| 10 or 12 | 120 | 600 or 720 | 1 | 60 | 0.83 |
|   |   |   | 2 | 30 | 1.67 |
|   |   |   | 3 | 20 | 2.50 |
|   |   |   | 4 | 15 | 3.30 |
|   |   |   | 5 | 12 | 4.17 |
| 12 only | 120 | 720 | 6 | 10 | 5.00 |

The entries in Table 2 show that liquid crystal devices 34 with 48 or 120 electrodes stripes are particularly useful. For the 250μ cable standard where the liquid device 34 dimension is 125μ, the 48 electrode configuration is easily produced with photolithographic techniques and should be very inexpensive. A method for forming stripe electrodes 44 is described in U.S. Pat. No. 4,882,235, entitled "Liquid Crystal Cell Window", issued Nov. 21, 1989, inventor Daniel P. Resler, and assigned to the same assignee as the present invention, which patent is incorporated herein by reference. Electron beam lithographic techniques could be used to form 120 electrodes on a 125μ liquid device 34.

Figure 3:
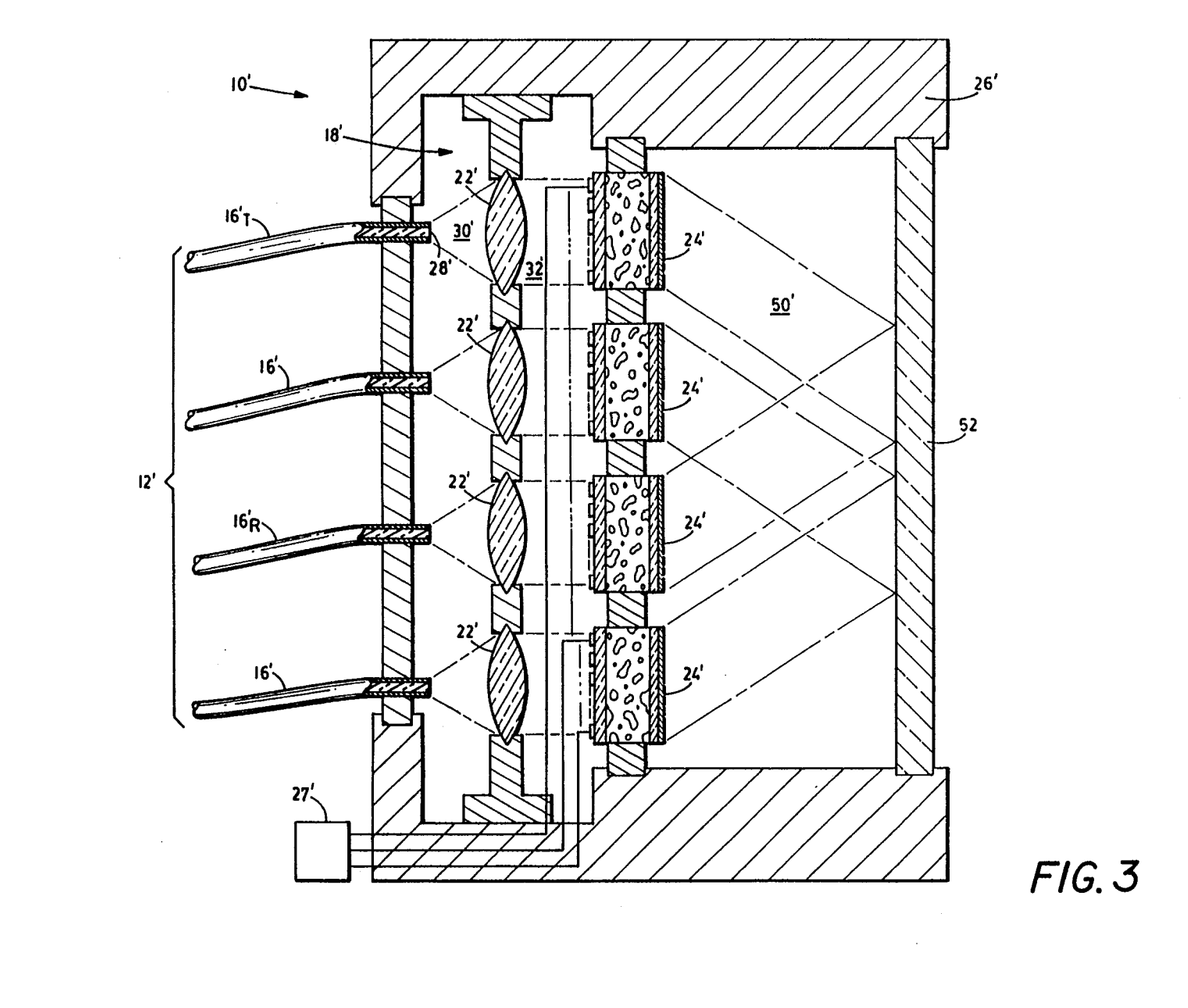
FIG. 3 is a schematic diagram of a data communication system according to an alternative embodiment of the invention.

Referring now to FIG. 3, a data communication system 10' is shown. Here, equivalent elements of the communication system 10 are designated in FIG. 3 by a prime (') notation. Here, system 10' includes only one set 12' of a plurality of fiber optic cables 16'. The switching network 18' includes a support structure 26', for securing light emitting/light receiving ends 28' of the plurality of fiber optic cables 16' in predetermined positions, as shown. Each one of a plurality of collimating lenses 22' is also secured in a predetermined position relative to a corresponding one of the fiber optic cables 16' by support structure 26'. More specifically, the divergent beam 30', of modulated light emitted at the terminal, or light transmitting/light receiving end 28' of a fiber optic cable 16' is collimated and directed as a collimated beam 32' of modulated light along the optic axis of the lens 22'. A beam steerer 24' is provided to direct the collimated beam 32' produced from light emitted by one of the fiber optic cables 16' to another one of the fiber optic cables 16' in the set 12'. That is, the light emitted from the light emitting/light receiving end 28' of one of the fiber optic cables 16' in set 12', say cable $16'_T$ is angularly deflected, in accordance with an electrical signal fed to switching network 18' by controller 27', to the reflective surface of a mirror 52. The exiting beam 50' is, after reflection by the mirror 52, passed to the light emitting/light receiving end 28' of another one of the plurality of fiber optic cables 16' in set 12', say $16'_R$, as shown. Again, principles of reciprocity apply. Thus, data can be coupled between one of the cables 16 and another one of the cables 16 selectively in accordance with the electrical control signals provided to beam steerers 24' by controller 27'.

Figure 4:
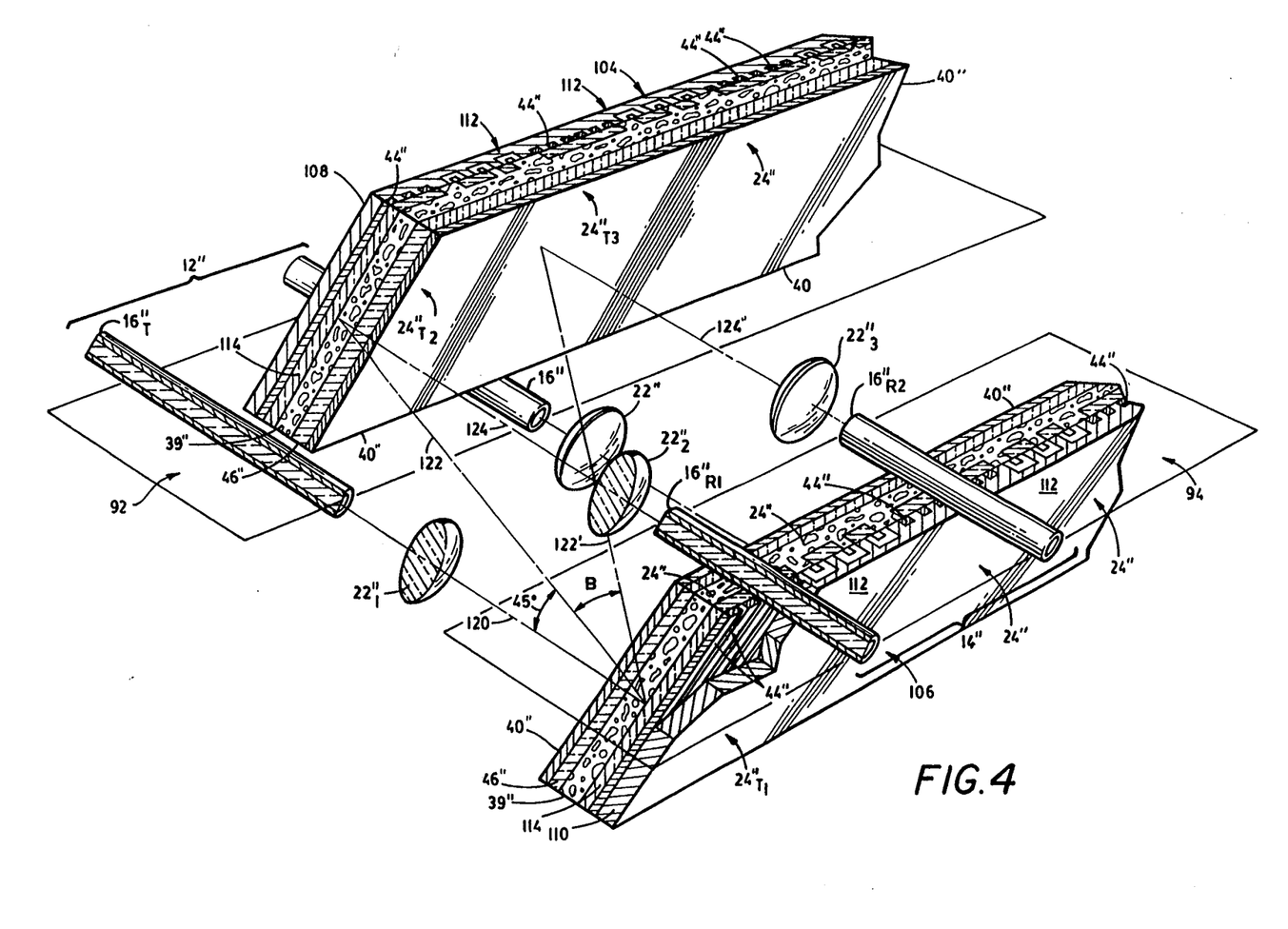
FIG. 4 is a schematic diagram of a data communication system according to an another alternative embodiment of the invention.
Figure 5:
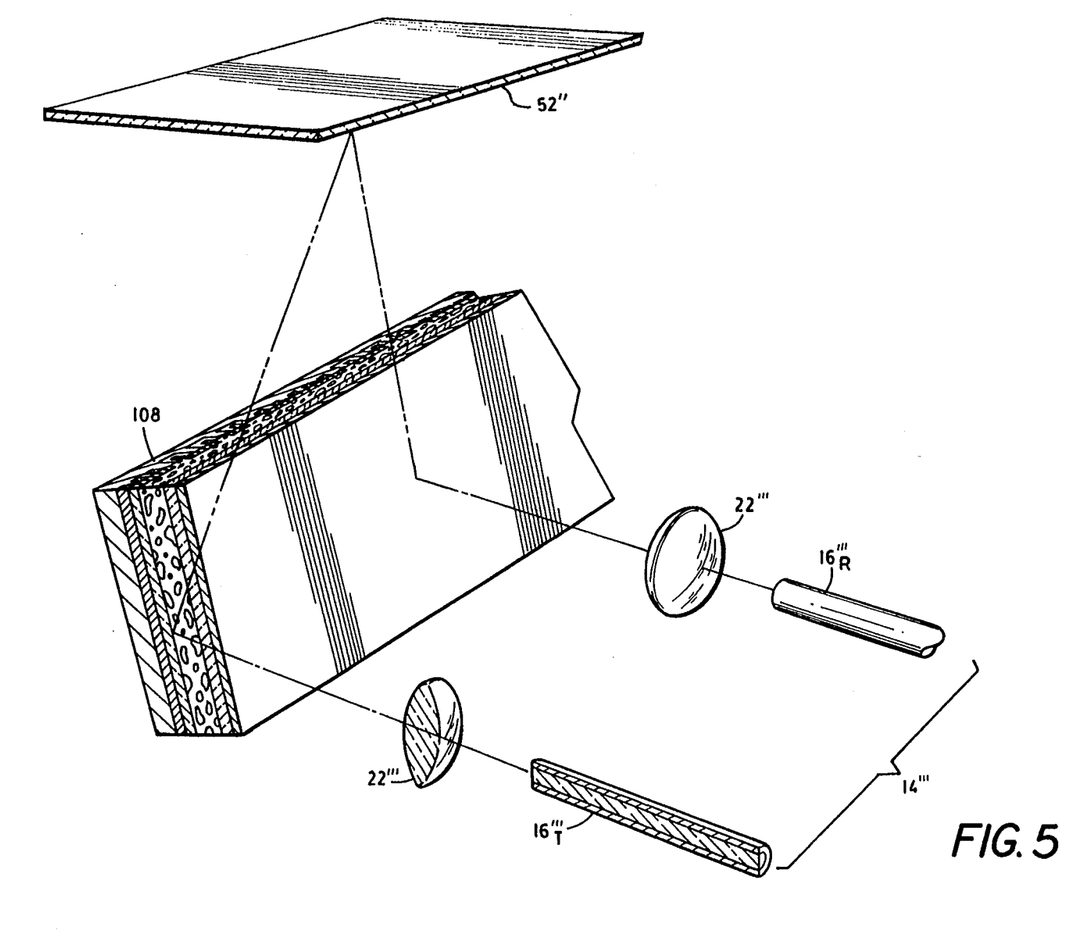
FIG. 5 is a schematic diagram of a data communication system according to an another alternative embodiment of the invention.

As described in U.S. Pat. No. 5,018,835, the beam steerer 24 may be transmissive to incident light, as shown in FIG. 1, or it may be reflective to incident light as shown in FIGS. 4 and 5. Thus, referring to FIG. 4, it is first noted that the support structure is not shown, for simplicity. It is next noted that a double prime (") designation is used to indicate elements equivalent to those used in connection with FIGS. 1 and 3. Thus, a first plurality of laterally displaced fiber optic cables 16" in set 12" is disposed in a first horizontal plane 92, and a second set 14" of fiber optic cables 16" in set 14" is disposed in a second horizontal plane 94; the second plane 94 being parallel to, and vertically positioned above, the first plane 92, as shown. Further, a first set 104 and second set 106 of beam steerers 24" are formed as reflective liquid crystal devices. Here, the beam steerers 24" in the first set 104 and second set 106 are identical in construction and are formed on a separate semiconductor substrate 108, 110, here silicon or gallium arsenide, respectively, as shown. Thus, the substrates 108, 110 each have a plurality of sets of conductor stripe electrodes 44" formed thereon. Each set 24" of stripe electrodes 44" corresponds to one of the beam steerers 24 of FIG. 1. Between each set of stripe electrodes 44", is a region 112. Region 112 has formed therein integrated circuits for supplying control signals to the adjacent set of stripe electrodes 44" of the adjacent one of the beam steerers 24". Disposed on the substrates 108, 110 over each set of stripe electrodes 44" is a reflective surface 114. Between the substrates 108, 110 and transparent opposing window 46" is the liquid crystal material 39". Disposed over the window 46" are transparent common conductors 40".

Thus, considering for example, cable $16''_T$, diverging light emitted therefrom passes through the corresponding collimating lens $22_1$ along axis 120. The light collimated by lens $22_1$ is intercepted by reflecting surface 114 of the beam steerers $24''_{T1}$. The planar reflecting surface 114 of the beam steerers 24" on substrate 110 is tilted upwardly 112.5 degrees with respect to the horizontal plane 92 towards the planar reflecting surface 114 of the beam steerers 24" on substrate 108. (Thus, the perpendicular, or normal, to the plane of the reflecting surface 114 is at a 22.5 degree angle with respect to axis 120). The planar reflecting surface 114 of the beam steerers 24" on substrate 108 is tilted downward 112.5 degrees with respect to the horizontal plane 94 towards the planar reflecting surface 114 of the beam steerers 24" on substrate 110. Thus, the planar surfaces 114 of the beam steerers 24" on substrate 108 is parallel to the planar reflecting surface 114 of the beam steerers 24" on substrate 110.

Here, consider first the condition when the control signal fed to the beam steerers 24" produces a uniform voltage distribution across the vertical stripe electrodes 44" of the beam steerers 24" (i.e., the case where the beam steerer 24" does not provide any horizontal, or lateral, angular beam deflection). Thus, because of the angular tilt of the planar reflecting surface 114 of beam steerer $24''_{T1}$ on substrate 108, relative to the plane 92, the intercepted beam is re-directed upward along axis 122, such axis 122 being at an angle 45 degree angle with respect to the axis 120, toward beam steerer $24''_{T2}$. The beam is next intercepted by reflecting surface 114 of beam steerer $24''_{T2}$ formed on substrate 108. Because of the angular tilt of the planar reflective surface 114 of such beam steerer $24''_{T2}$, the intercepted beam is directed along axis 124 through lens $22''_2$ to fiber optic cable $16''_{R1}$, where axis 124 is parallel to, and disposed vertically above, axis 120. On the other hand, with a control signal fed to beam steerer $24''_{T1}$ which causes an horizontal, or lateral, angular deflection to the beam incident thereon (i.e., the beam passing along axis 120), is deflected laterally at angle B relative to axis 120. Thus, in addition to its inherent (i.e., geometrically produced) vertical 45 degree vertical deflection, such beam is deflected to one of the laterally disposed beam steerers 24" in the second set thereof, say, for example along axis 122' to laterally displaced beam steerer $24''_{T3}$. In such case the light intercepted by the reflective surface 114 of beam steerer $24''_{T3}$ is directed along axis 124" through lens $22''_3$, to fiber optic cable $16''_{R2}$ (axis 124" is parallel to but laterally displaced from axis 124). Again, principles of reciprocity apply so that information may be transmitted and received between the fiber optic cables 16" in set 12" and the fiber optic cables 16" in set 14" is shown.

Referring to FIG. 5, an arrangement using the reflective beam steerers 24''' of FIG. 4, but with only one set of fiber optic cables 16''', here set 14''', similar to the arrangement discussed above in connection with FIG. 3, as shown. Here, the reflecting surface of the beam steerers on substrate 108 is at a 45 degree angle with respect to the horizontal plane, as in FIG. 4, but the mirror 52" is parallel to the horizontal plane.

Having described preferred embodiments of the invention, it will now become readily apparent to one of skill in the art that other embodiments incorporating its concepts may be made. For example, in addition to electronically steering laser beams, liquid crystal phased arrays may be used to steer in multiple directions simultaneously. This capability may be used to provide electronically programmable branching trees for fiber optic communications. Two dimensional arrays of liquid crystal devices 34 with electronic addressing for both beam steering and simultaneous direction steering may be used in optical computing applications. The invention may be used in any system that requires the switching of optical signals. Large two dimensional areas of liquid crystal devices 34 may be useful for optical computing, as mentioned above, especially in image processing applications. It is felt, therefore, that the invention should not be restricted to the described embodiments, but rather should be limited only by the spirit and scope of appended claims.

What is claimed is:

1. A fiber optic switching system, comprising:
    a plurality of fiber optic cables;
    a support structure for securing light emitting/light receiving ends of the plurality of fiber optic cables in predetermined positions; and
    means for re-directing light emitted from the light emitting/light receiving end of one of the fiber optic cables to the light emitting/light receiving end of another one of the plurality of fiber optic cables; said redirecting means comprising;
    means for collimating the light emitted from one of the light emitting/light receiving ends for providing a collimated beam having a path with a direction;
    first means for intercepting and changing the direction of the path of the collimated beam;
    second means, disposed in the path of the collimated beam from the first intercepting and changing means, for intercepting and changing the direction of the path of the collimated beam; and
    means, disposed in the path of the collimated beam from the second intercepting and changing means, for focusing the collimated beam to the light emitting/light receiving end of another one of the plurality of fiber optic cables.

2. The system recited in claim 1 wherein the collimating means comprises a collimating lens.

3. The system recited in claim 2 wherein the first and second intercepting and changing means each comprises an optical beam phase shifter.

4. The system recited in claim 3 wherein the optical beam phase shifter comprises liquid crystal molecules disposed between a common electrode and a multiplicity of parallel stripe electrodes.

5. A switching system, for coupling information propagating as electromagnetic wave energy between selected ones of a plurality of terminals having a predetermined spatial relationship, each one of such terminals being adapted to transmit said wave energy and receive said transmitted wave energy, said system comprising:
    means, responsive to an electrical signal and positioned to receive the wave energy transmitted at one of the terminals, for changing the index of refraction of said means as said received wave energy passes through said means to direct said received energy to another one of the spaced terminals selectively in accordance with the electrical signal; and
    means for collimating the wave energy emitted from an end of one of the terminals for providing a collimated beam having a path with a direction; and
    said index of refraction changing means comprising:
        first means for intercepting and changing the direction of the path of the collimated beam comprising an optical beam phase shifter; and
        second means, disposed in the path of the collimated beam from the first intercepting and changing means, for intercepting and changing the direction of the path of the collimated beam comprising an optical beam phase shifter; and means, disposed in the path of the collimated beam from the second intercepting and changing means, for focusing the collimated beam to the another one of the terminals.

6. The system recited in claim 5 wherein the optical beam phase shifter comprises liquid crystal molecules disposed between a common electrode and a multiplicity of parallel stripe electrodes.

7. A system for coupling information propagating in a beam of electromagnetic wave energy between selected ones of a plurality of terminals having a predetermined spatial relationship, each one of such terminals being adapted to transmit said wave energy and receive said transmitted wave energy, said system comprising: means, responsive to an electrical signal and positioned to intercept the beam of wave energy emanating from one of the terminals, for re-directing said intercepted beam to another one of the spaced terminals selectively in accordance with the electrical signal, said redirecting means comprising:

means for collimating the wave energy emitted from one of the terminals for providing a collimated beam having a path with a direction;

first means for intercepting and changing the direction of the path of the collimated beam;

second means, disposed in the path of the collimated beam from the first intercepting and changing means, for intercepting and changing the direction of the path of the collimated beam; and means, disposed in the path of the collimated beam from the second intercepting and changing means, for focusing the collimated beam to another one of the terminals.

8. The system recited in claim 7 wherein the collimating means comprises a collimating lens.

9. The system recited in claim 8 wherein the first and second intercepting and changing means each comprises an optical beam phase shifter.

10. The system recited in claim 9 wherein the optical beam phase shifter comprises liquid crystal molecules disposed between a common electrode and a multiplicity of parallel stripe electrodes.

11. A method for coupling information propagating as electromagnetic wave energy between selected ones of a plurality of terminals having a predetermined spatial relationship, each one of such terminals being adapted to transmit said wave energy and receive said transmitted wave energy, said method comprising: the step of changing the index of refraction of a medium supporting propagation of the wave energy transmitted at one of the terminals to direct said received energy to another one of the spaced terminals selectively in accordance with an electrical signal, the changing step comprising the steps of:

collimating the wave energy emitted from an end of one of the terminals for providing a collimated beam having a path with a direction;

intercepting and changing the direction of the path of the collimated beam with an optical beam phase shifter;

again intercepting and changing the direction of the path of the collimated beam with a second optical beam phase shifter; and focusing the collimated beam to the another one of the terminals.

12. A method for coupling information propagating in a beam of electromagnetic wave energy between selected ones of a plurality of terminals having a predetermined spatial relationship, each one of such terminals being adapted to transmit said wave energy and receive said transmitted wave energy, said method comprising the steps of: intercepting the beam of wave energy emanating from one of the terminals and re-directing said intercepted beam to another one of the spaced terminals selectively in accordance with an electrical signal, said intercepting and redirecting step comprising the steps of:

collimating the wave energy emitted from an end of one of the terminals for providing a collimated beam having a path with a direction:

intercepting and changing the direction of the path of the collimated beam with an optical beam phase shifter;

again intercepting and changing the direction of the path of the collimated beam with a second optical beam phase shifter; and focusing the collimated beam to the another one of the terminals.

* * * * *